United States Patent
Yeom et al.

(10) Patent No.: US 11,634,122 B2
(45) Date of Patent: Apr. 25, 2023

(54) METHOD OF MOVING AUTONOMOUS VEHICLE AFTER ACCIDENT

(71) Applicants: HYUNDAI MOTOR COMPANY, Seoul (KR); KIA MOTORS CORPORATION, Seoul (KR)

(72) Inventors: Myung-Ki Yeom, Incheon (KR); In-Su Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 17/209,820

(22) Filed: Mar. 23, 2021

(65) Prior Publication Data

US 2022/0111837 A1 Apr. 14, 2022

(30) Foreign Application Priority Data

Oct. 12, 2020 (KR) .......................... 10-2020-0131360

(51) Int. Cl.
*B60W 30/09* (2012.01)
*B60W 50/02* (2012.01)
(Continued)

(52) U.S. Cl.
CPC ............ *B60W 30/09* (2013.01); *B60W 10/18* (2013.01); *B60W 10/20* (2013.01); *B60W 30/02* (2013.01); *B60W 30/0956* (2013.01); *B60W 30/143* (2013.01); *B60W 30/182* (2013.01); *B60W 30/18072* (2013.01); *B60W 50/0205* (2013.01); *B60W 60/0015* (2020.02); *B60W 2030/082* (2013.01); *B60W 2554/4042* (2020.02); *B60W 2554/4044* (2020.02); *B60W 2556/65* (2020.02)

(58) Field of Classification Search
CPC .. B60W 30/09; B60W 60/0015; B60W 10/18; B60W 10/20; B60W 30/02; B60W 30/0956; B60W 30/143; B60W 30/18072; B60W 30/182; B60W 50/0205; B60W 2554/4042; B60W 2554/4044; B60W 2556/65; B60W 2030/082
See application file for complete search history.

(56) References Cited

U.S. PATENT DOCUMENTS 8,874,279 B2 10/2014 Frye et al.
10,486,662 B2 11/2019 Nakatsuka
(Continued)

FOREIGN PATENT DOCUMENTS

KR 10-0980933 9/2010

*Primary Examiner* — Jeff A Burke
*Assistant Examiner* — Mohamad O El Sayah
(74) *Attorney, Agent, or Firm* — Fox Rothschild LLP

(57) ABSTRACT

A method of moving an autonomous vehicle to a safe zone after an accident is provided. The method includes: setting a threshold which is a criterion for determining a failure of a chassis system; determining whether a failure occurs by using the threshold; determining a control mode of twin clutches or a braking system; designating avoidance speed level in accordance with whether a following vehicle approaches; and setting a target trajectory to a safe zone and then generating braking torque on left and right wheels or controlling distribution of driving torque through the twin clutches in order to move the autonomous vehicle at the avoidance speed along the target trajectory.

17 Claims, 14 Drawing Sheets

(51) Int. Cl.
    *B60W 30/182*     (2020.01)
    *B60W 10/18*      (2012.01)
    *B60W 10/20*      (2006.01)
    *B60W 60/00*      (2020.01)
    *B60W 30/02*      (2012.01)
    *B60W 30/14*      (2006.01)
    *B60W 30/18*      (2012.01)
    *B60W 30/095*     (2012.01)
    *B60W 30/08*      (2012.01)

(56) References Cited

U.S. PATENT DOCUMENTS

| | | | | |
|---|---|---|---|---|
| 2015/0019063 | A1* | 1/2015 | Lu | B60W 40/04 |
| | | | | 701/25 |
| 2016/0325721 | A1* | 11/2016 | Jonasson | B62D 6/003 |
| 2017/0291560 | A1* | 10/2017 | Schroeder | B60T 8/92 |
| 2018/0188726 | A1* | 7/2018 | Newman | B60W 50/035 |
| 2019/0092323 | A1* | 3/2019 | Viehmann | G06V 20/588 |
| 2019/0255943 | A1* | 8/2019 | Kniess | F16H 48/24 |
| 2019/0337391 | A1* | 11/2019 | Crombez | B60W 30/02 |
| 2020/0086837 | A1* | 3/2020 | Le Cornec | G05D 1/0055 |
| 2020/0139990 | A1* | 5/2020 | Hiruma | B60W 50/0205 |
| 2020/0262421 | A1* | 8/2020 | Ito | F02D 29/02 |
| 2021/0012661 | A1* | 1/2021 | Yang | G08G 1/167 |
| 2021/0016825 | A1* | 1/2021 | Miura | B62D 5/0493 |
| 2021/0086757 | A1* | 3/2021 | Sugano | G08G 1/096816 |
| 2021/0197820 | A1* | 7/2021 | Keller | B60W 30/18145 |

\* cited by examiner

SENSORS FOR
AUTONOMOUS VEHICLE
(FRONT CAMERA, REAR CAMERA, ETC.)

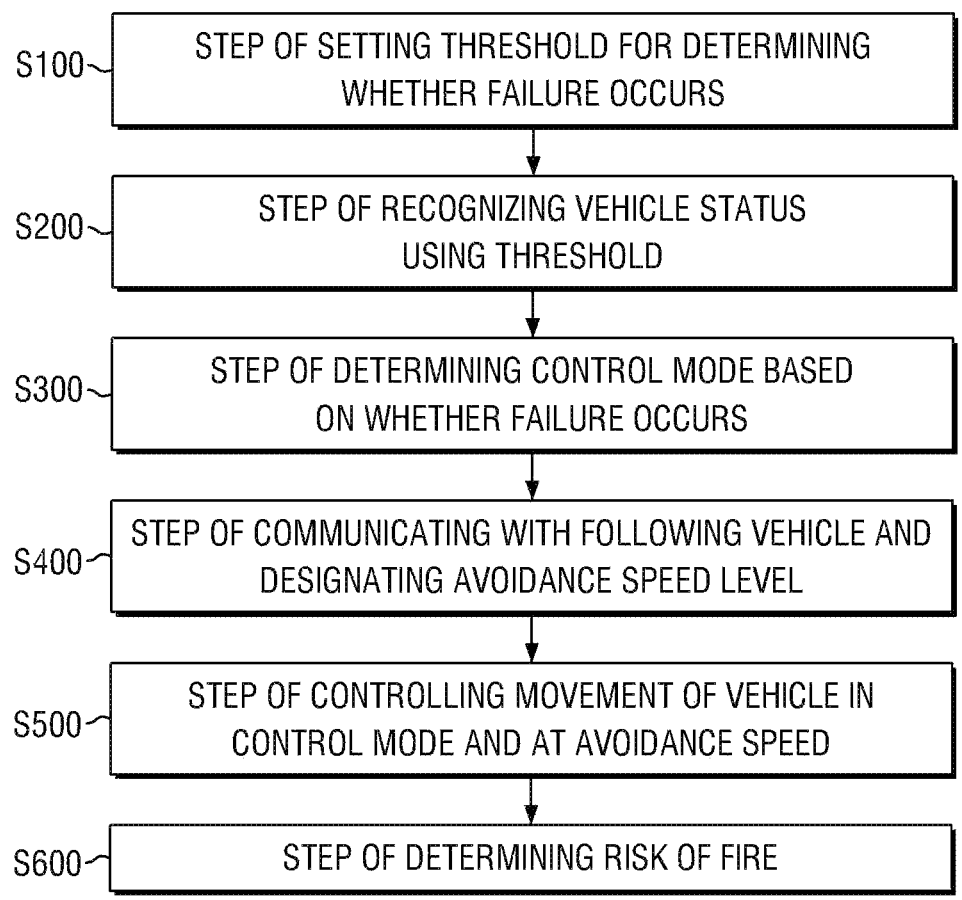

METHOD OF MOVING AUTONOMOUS VEHICLE AFTER ACCIDENT

CROSS-REFERENCE TO RELATED APPLICATION

This application claims priority to and the benefit of Korean Patent Application No. 10-2020-0131360, filed on Oct. 12, 2020, the disclosure of which is incorporated herein by reference in its entirety.

TECHNICAL FIELD

The present disclosure relates to a method of moving an autonomous vehicle after an accident.

BACKGROUND

An autonomous vehicle refers to a vehicle that determines a risk by recognizing a traveling environment, minimizes a driver's driving operation by planning a traveling route, and autonomously travels safely without being directly manipulated by the driver. An autonomous driving control unit mounted in the autonomous vehicle is connected to a chassis system such as an engine system, a steering system, and a braking system mounted in the vehicle and controls the vehicle.

Meanwhile, the chassis system may not be normally operated due to external impact or internal factors while the autonomous vehicle travels. Because there is a high probability that a secondary accident will occur in such a situation in which autonomous driving is not possible, there is a need for a technology for moving the autonomous vehicle to a safe zone.

SUMMARY

The present disclosure provides a different type of disclosure capable of enabling avoidance driving by controlling a braking system or twin clutches even in a situation in which a steering system is not normally operated when an accident occurs while an autonomous vehicle travels.

An exemplary embodiment of the present disclosure provides a method of moving an autonomous vehicle after an accident, the method including: a setting step of setting a threshold which is a criterion for determining a failure of a chassis system including an engine system, a steering system, a braking system, and twin clutches; a recognition step of recognizing whether the chassis system has failed by using the threshold; a determination step of determining whether a control mode is a first mode in which hydraulic braking and the twin clutches are cooperatively controlled, a second mode in which EPB braking and the twin clutches are cooperatively controlled, or a third mode in which only the twin clutches are controlled based on whether the braking system has failed in a situation in which the engine system and the twin clutches are normally operated; a designation step of designating a level of an avoidance speed of a host autonomous vehicle whether a following vehicle approaches; and a control step of setting a target trajectory to a safe zone and then controlling distribution of braking torque to left and right wheels or controlling distribution of driving torque through the twin clutches in order to move the autonomous vehicle at the avoidance speed along the target trajectory based on the control mode.

According to the exemplary embodiment of the present disclosure, the following effects are achieved.

First, even though the steering system is not normally operated, it is possible to move the autonomous vehicle to the safe zone by controlling the braking system or the twin clutches.

Second, in the first mode, the hydraulic braking, which operates at a high reaction speed, is involved, such that the autonomous vehicle may be controlled to be quickly moved to the safe zone and may be moved to a turning section where a turning radius is short, and as a result, a degree of freedom of vehicle movement control is larger than those in other control modes.

Third, in the second mode, the EPB is operated in advance to enable safety control, and the EPB braking is used, such that a degree of freedom of vehicle movement control is larger than that in the third mode in which only the twin clutches are used.

Fourth, the vehicle may be moved to the safe zone by means of the twin clutches even in the case in which the braking system is not normally operated.

Fifth, an avoidance speed is determined based on whether a following vehicle approaches, and the following vehicle may be guided in an avoidance direction, such that it is possible to prevent a secondary accident.

DRAWINGS

FIG. 3 is a view illustrating the method of moving an autonomous vehicle after an accident according to the exemplary embodiment of the present disclosure.

DETAILED DESCRIPTION

Hereinafter, exemplary embodiments of a method of moving an autonomous vehicle after an accident according to the present disclosure will be described in detail with reference to the drawings. Terms or words used herein should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

The following technologies in the related art have been proposed to control a vehicle after an accident of the vehicle.

(Related Art 1) U.S. Pat. No. 10,486,662 (DEVICE AND METHOD FOR CONTROLLING BRAKING DURING COLLISION) discloses a technology that detects external impact applied to a vehicle, notifies an emergency center of the detection result, and controls a brake to stop the vehicle and prevent an additional accident.

(Related Art 2) U.S. Pat. No. 8,874,279 (VEHICLE-INCIDENT DETECTION METHOD AND SYSTEM) relates to a method of detecting a vehicle accident and discloses a technology for detecting an accident by analyzing vehicle data and additional vehicle data by a cloud computing system in the event of a vehicle accident.

(Related Art 3) Korean Patent No. 10-0980933 relates to a method of controlling a vehicle after an accident and discloses a technology for controlling an engine in consideration of a status of the engine and a driver's driving intention when a vehicle accident is detected.

However, Related Art 1 merely stops the vehicle without moving the vehicle to a safe zone or attempting to perform avoidance driving, and as a result, there is a high probability that a secondary accident will occur. Related Art 2 is not a technology for controlling a movement of the vehicle, but is a technology related to detection of an accident. Related Art 3 moves the vehicle by controlling the engine but is a technology which is difficult to apply to the autonomous vehicle because a driver's intention is involved.

Figure 1:
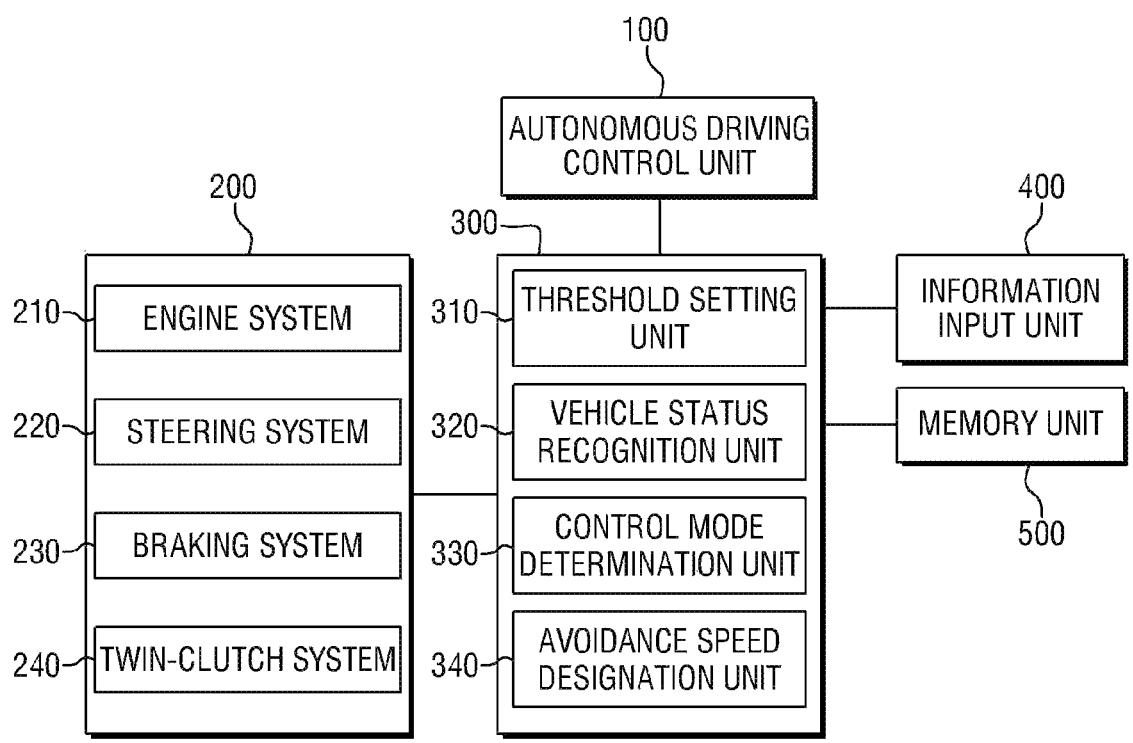
FIG. 1 is a view schematically illustrating components required for a method of moving an autonomous vehicle after an accident according to an exemplary embodiment of the present disclosure.
Figure 2A:
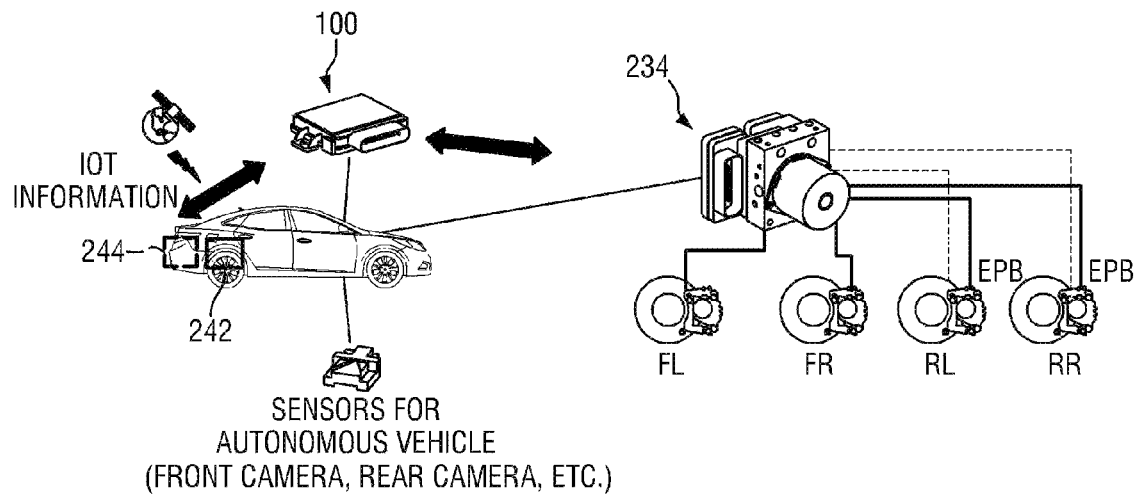
FIG. 2A is a view illustrating some components required for movement control among the components of a system illustrated in FIG. 1.
Figure 2B:
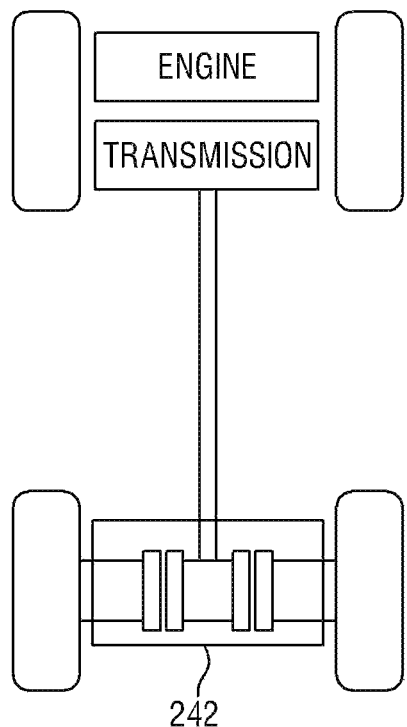
FIG. 2B is a view illustrating twin clutches.

FIG. 1 is a view schematically illustrating components required for a method of moving an autonomous vehicle after an accident according to an exemplary embodiment of the present disclosure, FIG. 2A is a view illustrating some components required for movement control among the components of a system illustrated in FIG. 1, and FIG. 2B is a view illustrating twin clutches.

Referring to FIG. 1, a system for moving an autonomous vehicle after an accident according to an exemplary embodiment of the present disclosure includes an autonomous driving control unit 100, a chassis system 200, a vehicle movement control setting unit 300, an information input unit 400, and a memory unit 500. Each component may be modularized and separated. A control function and a communication function may be performed by an electronic control unit (ECU) separately mounted for each control unit included in each system, and functions of the respective control units may be performed by the single ECU. The ECU module may be provided with one or more processors configured to operate by a set program, and the ECU module is configured to perform respective steps of an operating method to be described below.

The autonomous driving control unit 100 has a function of sensing and processing interior information and exterior information during driving by means of the information input unit 400 and autonomously determines a target traveling route by recognizing a surrounding environment even though a driver does not control a brake, a steering wheel, an accelerator pedal, and the like. The autonomous driving control unit 100 may communicate with the chassis system 200, the vehicle movement control setting unit 300, the information input unit 400, and the memory unit 500 in a wired or wireless manner.

The chassis system 200 includes an engine system 210, a steering system 220, a braking system 230, and a twin-clutch system 240. The engine system 210 includes various types of components for generating and controlling driving torque, the steering system 220 includes various types of components for steering the vehicle, and the braking system 230 includes various types of components for generating and controlling braking torque. Well-known components may be used for the engine system 210, the steering system 220, and the braking system 230.

Meanwhile, referring to FIGS. 2A and 2B, the braking system 230 includes hydraulic braking components and electronic parking brakes (EPBs). The hydraulic braking components generate hydraulic braking pressure by being requested by the autonomous driving control unit 100 and transmit the hydraulic pressure to wheel cylinders installed on respective vehicle wheels FL, FR, RL, and RR, thereby performing frictional braking. The EPB (electronic parking brake) is a brake that automatically operates when the engine is stopped or automatically stops the operation when the engine is started and the accelerator pedal is pushed. In the exemplary embodiment of the present disclosure, the EPBs are operated on the rear wheels RL and RR, but the present disclosure is not necessarily limited thereto, and the EPBs may be operated on the front wheels or all of the front and rear wheels. In the exemplary embodiment of the present disclosure, the control of the hydraulic braking and the EPB is comprehensively managed by a braking control unit 234.

The twin-clutch system 240 includes twin clutches 242 and a twin-clutch control unit 244. The twin clutches 242 are mounted on the front or rear wheel and distribute the driving torque, which is generated by the engine system, to the left and right wheels. The twin clutches 242 substitute for a differential gear. The differential gear transmits the same driving torque to the left and right wheels. If one of the wheels is placed on a slippery road surface or the like, the wheel may slip because the driving torque is concentrated on the wheel to which low driving torque is applied. In order to prevent this situation, the driving torque may be individually distributed through the twin clutches 242 connected to the left and right wheels, respectively. For example, the twin clutches 242 may distribute higher driving torque to any one of the left and right wheels or may equally distribute the driving torque to the left and right wheels.

The twin-clutch control unit 244 receives a control signal from the autonomous driving control unit 100 and controls and distribute the driving torque to the left and right wheels.

The vehicle movement control setting unit 300 includes a threshold setting unit 310, a vehicle status recognition unit 320, a control mode determination unit 330, and an avoidance speed designation unit 340.

The threshold setting unit 310 sets a threshold which is a criterion for determining a failure of the chassis system 200. The vehicle status recognition unit 320 determines whether the chassis system 200 has failed by using the threshold set by the threshold setting unit 310. The control mode determination unit 330 determines whether the control mode is one of a mode in which the hydraulic braking and the twin clutches are cooperatively controlled, a mode in which the EPB braking and the twin clutches are cooperatively controlled, and a mode in which only the twin clutches are controlled based on whether the chassis system 220 has failed. Based on whether the following vehicle approaches, the avoidance speed designation unit 340 designates an avoidance speed at which the host autonomous vehicle reaches the safe zone.

The information input unit 400 collects vehicle interior information and vehicle exterior information. In this case, the vehicle interior information means information collected by various types of sensors, for example, a wheel speed sensor, a yaw rate sensor, a steering angle sensor, and a lateral acceleration sensor that may recognize the interior status of the vehicle. The vehicle exterior information means information collected by various types of sensors, for example, RADAR, LIDAR, image sensors, a GPS, a navigation system, IoT (Internet of Things) modules, and V2V (vehicle-to-vehicle) modules that may recognize the exterior status of the vehicle.

The memory unit 500 stores the vehicle interior information and the vehicle exterior information collected by the information input unit 400 and provides information required for an arithmetic operation of the vehicle movement control setting unit 300.

FIG. 3 is a view illustrating the method of moving an autonomous vehicle after an accident according to the exemplary embodiment of the present disclosure.

Hereinafter, the method of moving an autonomous vehicle after an accident according to the exemplary embodiment of the present disclosure will be specifically described based on the above-mentioned configuration.

First, referring to FIG. 3, a step of setting a threshold which is a criterion for determining whether the chassis system 200 has failed while the autonomous vehicle travels is performed (S100). This step is performed by the threshold setting unit 310 of the system.

The chassis system 200 may not be normally operated due to various reasons such as external impact or an error of an internal system during driving, and thus it is necessary to set the threshold which is a criterion for determining a failure.

Figure 4:
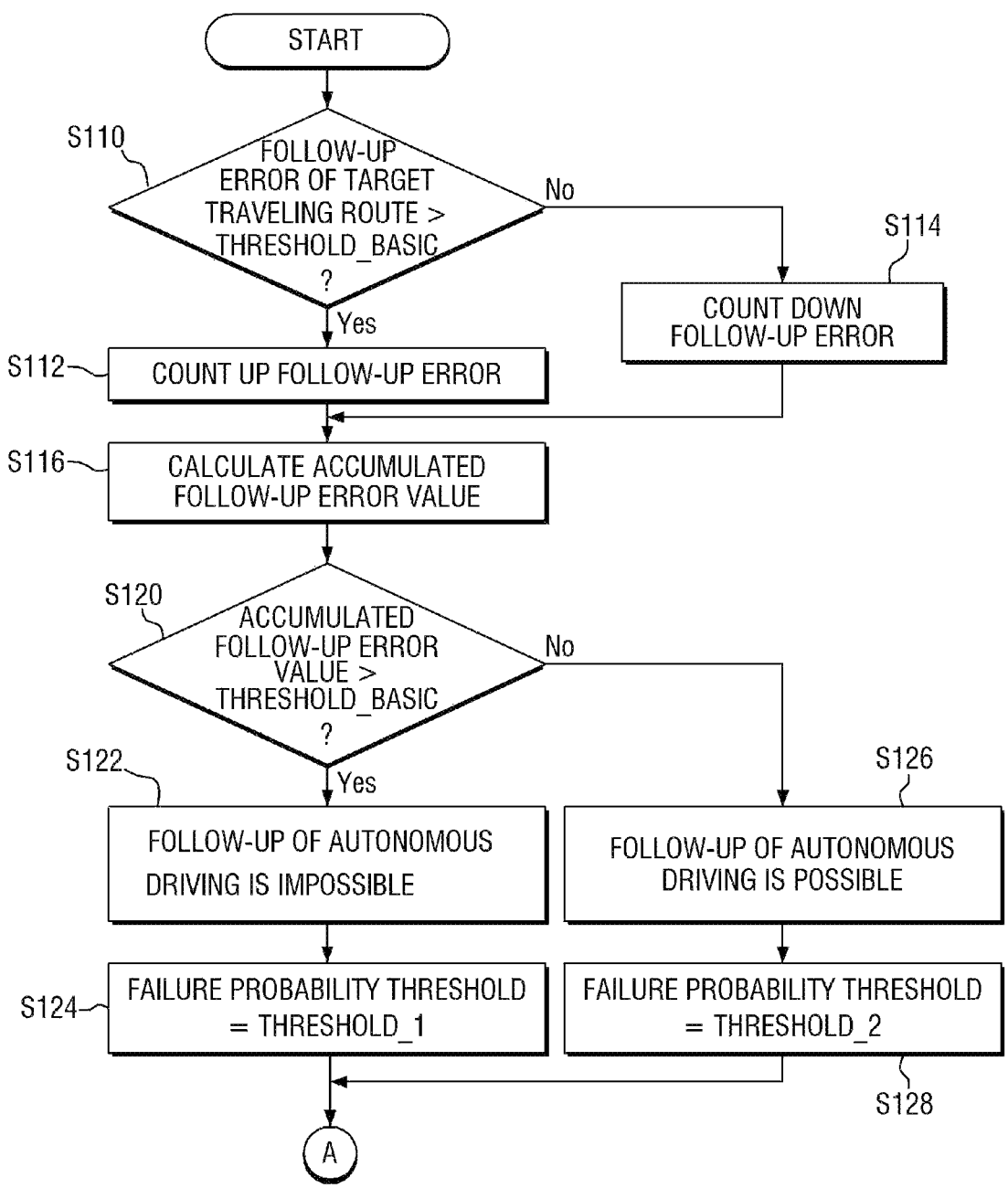
FIG. 4 is a flowchart illustrating a method of setting a threshold according to the exemplary embodiment of the present disclosure.

FIG. 4 is a flowchart illustrating a method of setting a threshold according to the exemplary embodiment of the present disclosure.

The autonomous vehicle controls the chassis system 200 so that a current traveling route follows a predetermined target traveling route. If there is a consistent difference between the current traveling route and the target traveling route, it may be determined that probability of a failure of the chassis system 200 is high. In the exemplary embodiment of the present disclosure, the threshold is set in accordance with a follow-up error which is a difference between the target traveling route and the current traveling route.

Referring to FIG. 4, when there occurs a follow-up error which is the difference between the current traveling route and the target traveling route, the threshold setting unit 310 compares the follow-up error with predetermined Threshold_basic (S110). In this case, counting-up is performed when the follow-up error is larger than Threshold_basic for a predetermined time during driving (S112), and counting-down is performed when the follow-up error is smaller than Threshold_basic (S114), such that the accumulated follow-up error is calculated (S116). Thereafter, the threshold setting unit 310 compares the accumulated follow-up error with Threshold_basic again (S120). In this case, when the accumulated follow-up error is larger than Threshold_basic, it is determined that the autonomous driving is impossible (S122), such that the threshold, which is a criterion for determining a failure, is set to Threshold_1 (S124). In this case, Threshold_1 is a value smaller than Threshold_basic. On the contrary, when the accumulated follow-up error is smaller than Threshold_basic, it is determined that the autonomous driving is possible (S126), such that the threshold, which is a criterion for determining a failure, is set to Threshold_2 (S128). In this case, Threshold_2 is a value larger than Threshold_basic.

Figure 5:
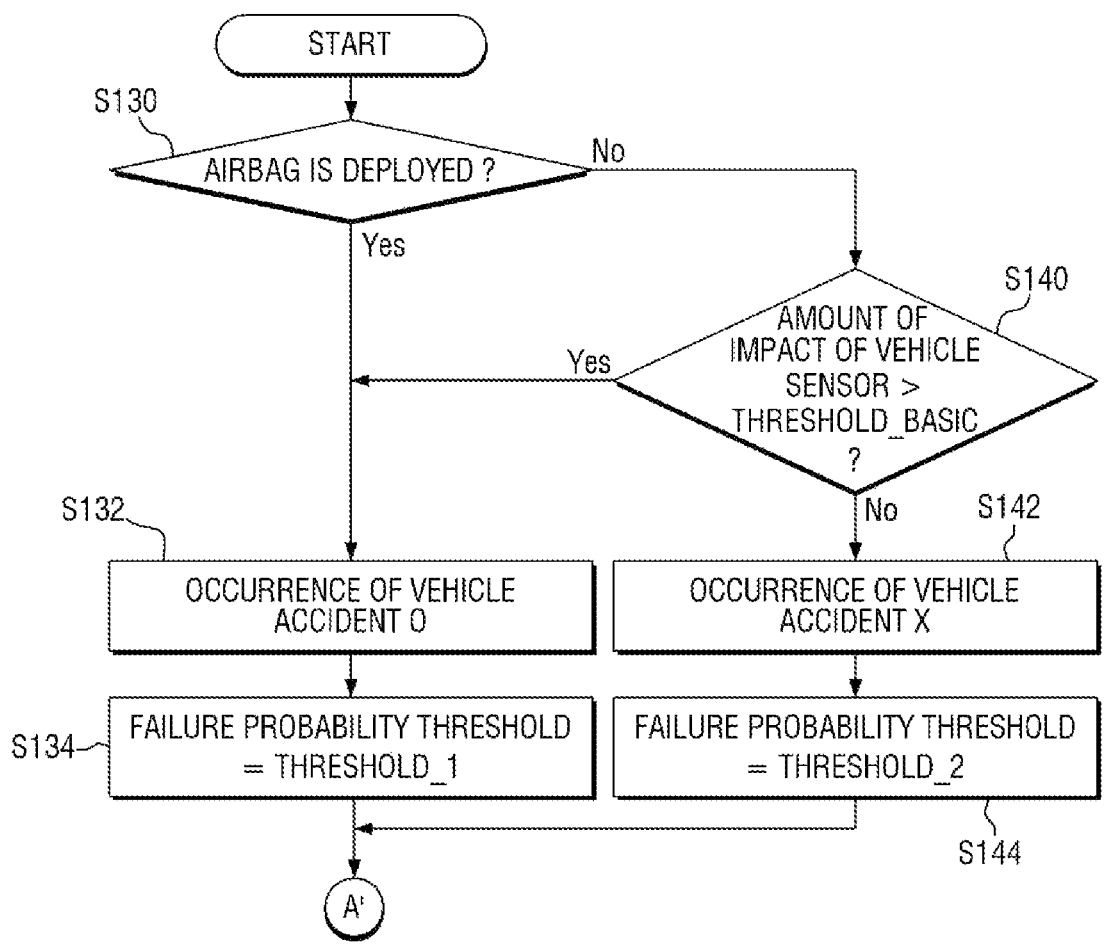
FIG. 5 is a flowchart illustrating a method of setting a threshold according to another exemplary embodiment of the present disclosure.

FIG. 5 is a flowchart illustrating a method of setting a threshold according to another exemplary embodiment of the present disclosure.

When abnormal behavior of the vehicle occurs when an accident occurs while the autonomous vehicle travels, it may be determined that probability of a failure of the chassis system is high. In this case, the abnormal behavior of the vehicle may be determined based on a signal collected by the information input unit 400. In another exemplary embodiment of the present disclosure, the threshold is set by determining a situation in which an airbag is deployed as the abnormal behavior of the vehicle.

Referring to FIG. 5, the threshold setting unit 310 determines whether the airbag is deployed when an accident occurs (S130). When the airbag is deployed, it is determined that a vehicle accident occurs (S132), and it is determined that probability of a failure of the chassis system 200 is high (S132), such that the threshold, which is a criterion for determining a failure, is set to Threshold_1 (S134). In this case, Threshold_1 is a value smaller than predetermined Threshold_basic. In contrast, when the airbag is not deployed, the amount of vehicle impact collected by the information input unit 400 is compared with Threshold_basic (S140). This is because the vehicle accident may be determined when a rapid change occurs on the vehicle even though the airbag is not deployed. Therefore, when the amount of vehicle impact is larger than Threshold_basic, it is determined that probability of a failure of the chassis system 200 is high, such that the threshold, which is a criterion for determining a failure, is set to Threshold_1. In contrast, when the amount of vehicle impact is smaller than Threshold_basic, it is determined that probability of a failure of the chassis system 200 is low (S142), such that the threshold, which is a criterion for determining a failure, is set to Threshold_2 (S144). In this case, Threshold_2 is a value larger than Threshold_basic.

Meanwhile, in the exemplary embodiments of the present disclosure, the criteria for determining a failure of the chassis system 200 are set as the two threshold values, but the number of thresholds may be variously set in accordance with a magnitude of the accumulated follow-up error or the threshold may be maintained as Threshold_basic.

Figure 6:
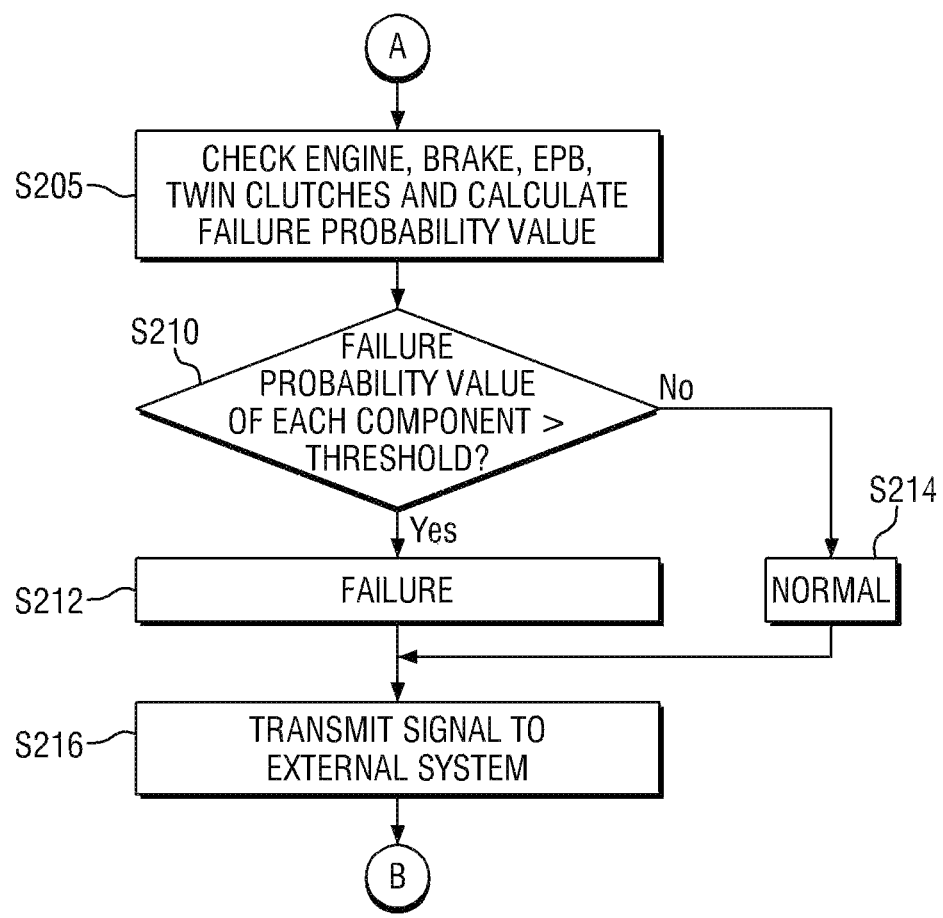
FIG. 6 is a flowchart illustrating a method of determining whether a chassis system has failed according to the exemplary embodiment of the present disclosure.

FIG. 6 is a flowchart illustrating a method of determining whether a chassis system has failed according to the exemplary embodiment of the present disclosure.

Next, referring to FIG. 3, a step of determining whether the chassis system 200 has failed by using the threshold set by the threshold setting unit 310 is performed (S200). This step is performed by the vehicle status recognition unit 320 on the system.

Referring to FIG. 6, the vehicle status recognition unit 320 calculates a failure probability value by checking actuators which are components of the engine system 210, the steering system 220, the braking system 230, and the twin-clutch system 240 included in the chassis system 200 (S205). In this case, the failure probability value may be calculated by comparing performance of the actuator before the failure and performance of the actuator after the failure. For example, the failure probability value may be calculated by comparing braking pressure applied to the brake from the braking system before the failure and braking pressure applied to the brake from the braking system after the failure.

Thereafter, the vehicle status recognition unit 320 compares the failure probability values of each of the components of the system with the threshold (S210). When the failure probability value of each of the actuators is larger than the threshold, it is determined that the failure occurs (S212), and when the failure probability value of each of the actuators is smaller than the threshold, it is determined that the chassis system is normal (S214).

Meanwhile, when it is determined that the chassis system 200 has failed, an emergency signal may be transmitted to an external system (S216). The emergency signal may include vehicle status information and the like after the accident.

Figure 7:
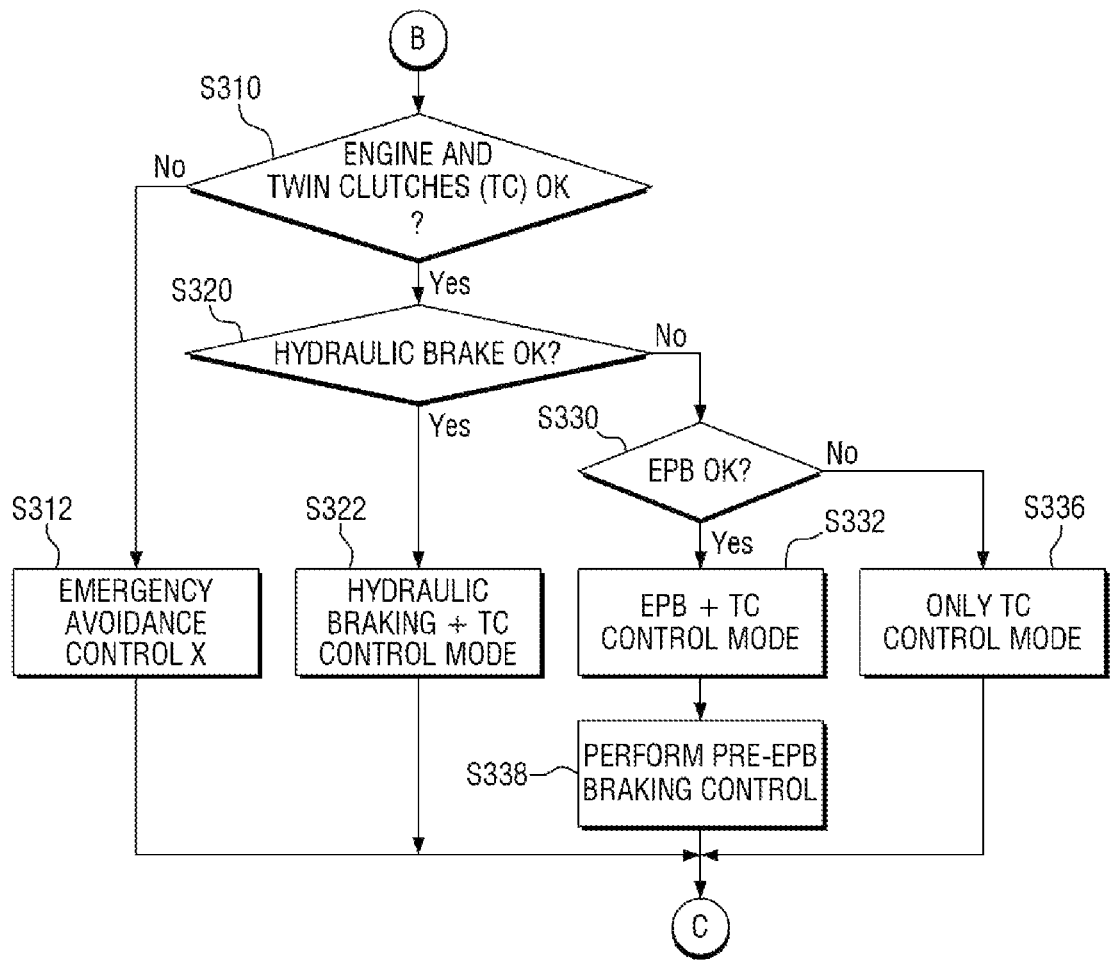
FIG. 7 is a flowchart illustrating a method of determining a control mode according to the exemplary embodiment of the present disclosure.

FIG. 7 is a flowchart illustrating a method of determining the control mode according to the exemplary embodiment of the present disclosure.

Next, referring to FIG. 3, based on whether the chassis system 200 has failed determined by the vehicle status recognition unit 320, a step of determining the control mode to be performed to move the vehicle is performed (S300). This step is performed by the control mode determination unit 330 on the system. The control mode may be classified into the mode in which the hydraulic braking and the twin clutches are cooperatively controlled, the mode in which the EPB braking and the twin clutches are cooperatively controlled, and the mode in which only the twin clutches are controlled.

Meanwhile, the present disclosure may be applied when the steering system is not normally operated and the braking system and the twin-clutch system are normally operated. If the steering system is normally operated, the autonomous driving control unit 100 may control the steering system to move the vehicle to the safe zone. Therefore, the control mode determination unit 330 may perform the following determination process on the assumption that the steering system is not normally operated.

First, referring to FIG. 7, the control mode determination unit 330 considers whether the engine and the twin clutches 242 are normally operated (S310). Whether a hydraulic brake is normally operated in the situation in which the engine and the twin clutches 242 are normally operated is determined (S320). When the hydraulic brake is normally operated, the control mode is determined as the mode (hereinafter, referred to as a 'first mode') in which the hydraulic braking and the twin clutches are cooperatively controlled (S322). When the hydraulic brake is not normally operated, whether the EPB is normally operated is considered (S330). In this case, when the EPB is normally operated, the control mode is determined as the mode (hereinafter, referred to as a 'second mode') in which the EPB and the twin clutches are cooperatively controlled (S332). When the EPB is not normally operated, the control mode is determined as the mode (hereinafter, referred to as a 'third mode') in which only the twin clutches are controlled (S336). The driving torque is not normally generated when the engine and the twin clutches 242 are not normally operated, and in the exemplary embodiment of the present disclosure, emergency avoidance control is not performed (S312).

Meanwhile, the reason why the control mode is determined as the first mode instead of the second and third modes in the situation in which all the components illustrated in FIG. 7 are normally operated is that the vehicle movement control may be more quickly performed in the first mode than in the other control modes. This will be described below.

Meanwhile, the time of approximately one second is taken until full braking is completed by the EPB. Therefore, the braking is performed in advance for quick avoidance of the autonomous vehicle, and this is called Pre-EPB. A point in time at which the Pre-EPB is performed is a point in time at which the second mode is set, and the Pre-EPB is performed before the vehicle control is performed (S336). The amount of braking of the Pre-EPB is a predetermined value set from the total amount of braking of the EPB. For example, the amount of braking of the Pre-EPB may be set to about 20% of the total amount of braking of the EPB. In this case, the Pre-EPB may be controlled so that the braking force is equally generated on the left and right wheels.

Figure 8:
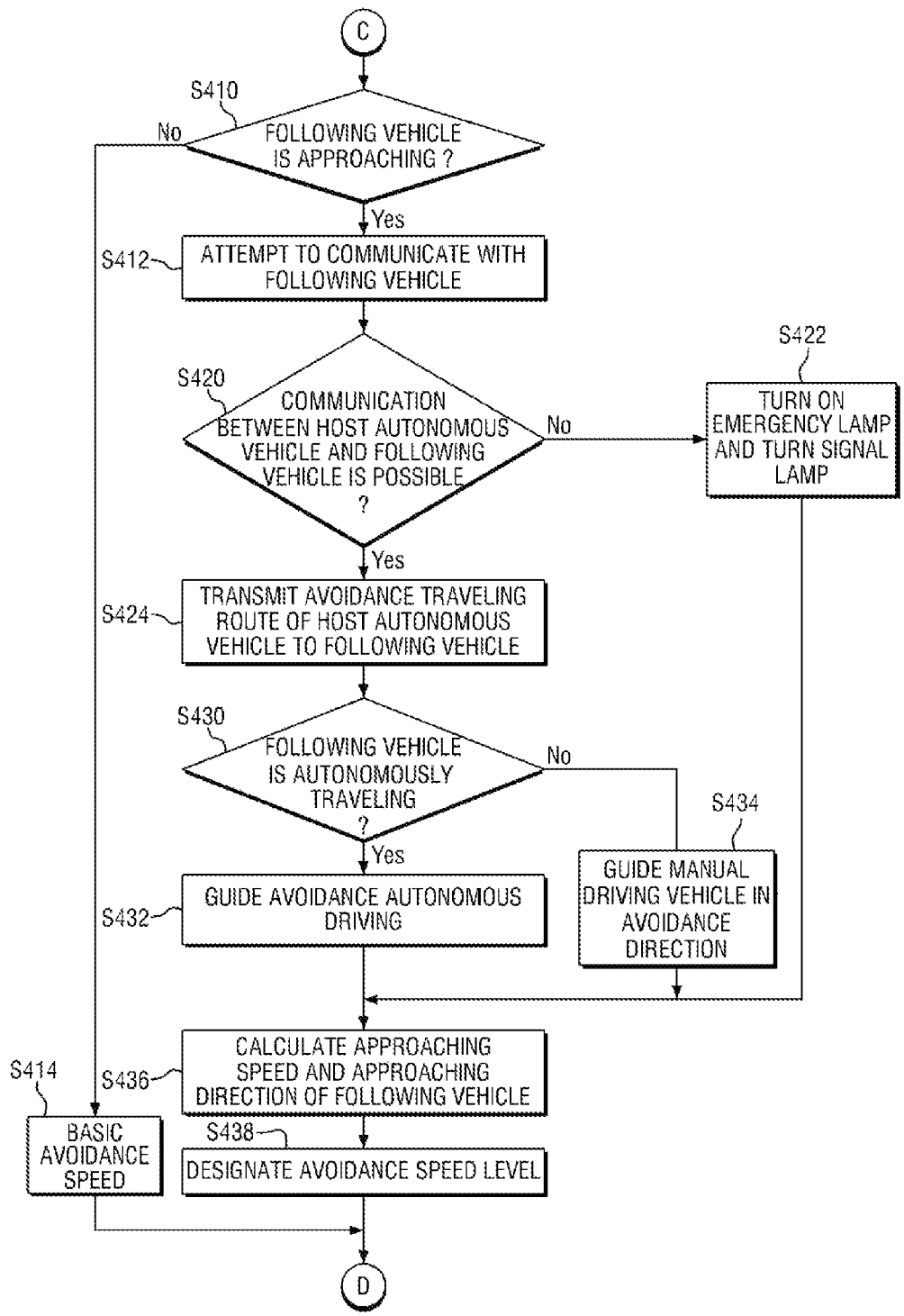
FIG. 8 is a flowchart illustrating a method of designating an avoidance speed level of a host autonomous vehicle according to the exemplary embodiment of the present disclosure.

FIG. 8 is a flowchart illustrating a method of designating an avoidance speed level of the host autonomous vehicle according to the exemplary embodiment of the present disclosure.

Next, referring to FIG. 3, a step of designating an avoidance speed level of the host autonomous vehicle is performed (S400). This step is performed by the avoidance speed designation unit 340 on the system. In this case, the avoidance speed means a speed required to move the host autonomous vehicle to the safe zone.

Referring to FIG. 8, the avoidance speed designation unit 340 determines whether the following vehicle is approaching by using front and rear cameras, V2I, V2V, CCTV, and the like mounted in the vehicle (S410).

When the following vehicle is approaching, communication with the following vehicle is attempted (S412), and whether the communication is enabled is determined (S420). In this case, as the communication method, a wireless communication method such as V2I, V2V, IoT, or LTE may be used, and various methods of receiving signals from headlamps and turn signal lamps of the following vehicle by using the camera of the host autonomous vehicle may be used. When the communication between the host autonomous vehicle and the following vehicle is not possible, a turn signal lamp or an emergency lamp is turned on in order to notify the following vehicle of an avoidance traveling route of the host autonomous vehicle (S422). When the communication between the host autonomous vehicle and the following vehicle is possible, the avoidance traveling route of the host autonomous vehicle is transmitted to the following vehicle (S424), and whether the following vehicle is an autonomous vehicle is checked (S430). When the following vehicle is an autonomous vehicle, the following vehicle is guided to travel along a route in which a risk of collision is low in consideration of the avoidance traveling route of the host autonomous vehicle transmitted to the following vehicle (S432). When the following vehicle is a manual driving vehicle, the following vehicle is guided so as not to collide with the host autonomous vehicle. For example, the guide method may transmit a signal for vibrating a steering wheel of the following vehicle or controlling steering of the following vehicle (S434). Thereafter, a speed at which the following vehicle approaches and a direction in which the following vehicle approaches are calculated (S436), and the avoidance speed level of the host autonomous vehicle is designated in consideration of the approaching speed and the approaching direction of the following vehicle (S438). In this case, the avoidance speed level of the host autonomous vehicle may be set through various steps in accordance with the behavior of the following vehicle. For example, when a speed of the following vehicle is low, the avoidance speed designation unit 340 determines that a risk of collision is low and sets the avoidance speed level of the host autonomous vehicle to a low level. When a speed of the following vehicle is high, the avoidance speed designation unit 340 determines that a risk of collision is high and sets the avoidance speed level of the host autonomous vehicle to a high level.

Meanwhile, when no following vehicle approaches, the avoidance speed level of the host autonomous vehicle is set to a predetermined basic avoidance speed (S414).

Figure 9:
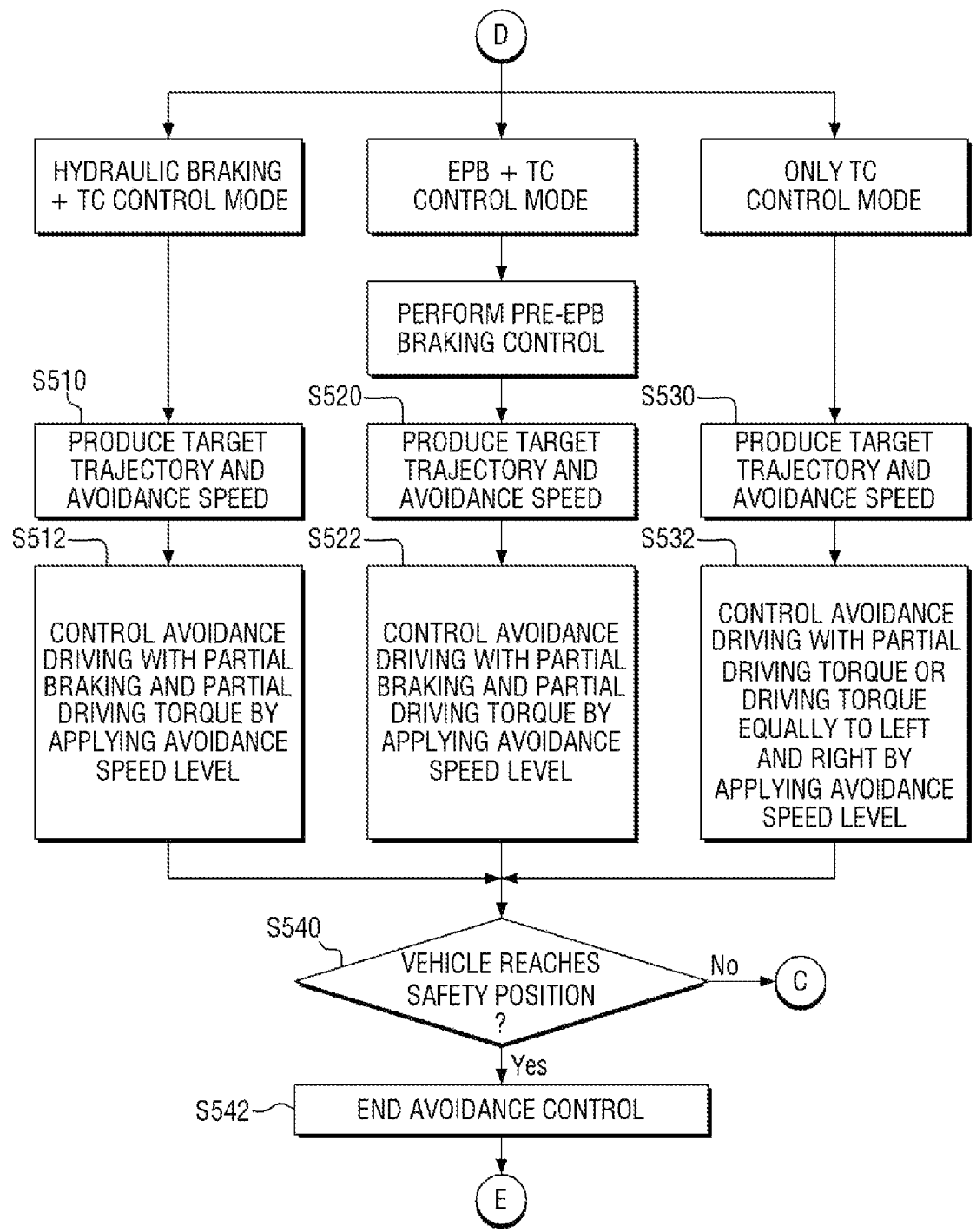
FIG. 9 is a flowchart illustrating a method of controlling a vehicle movement according to the exemplary embodiment of the present disclosure.

FIG. 9 is a flowchart illustrating a method of controlling a vehicle movement according to the exemplary embodiment of the present disclosure.

Next, referring to FIG. 3, a step of controlling the vehicle to move the vehicle to the safe zone based on the determined control mode and the designated avoidance speed is performed (S500). This step is performed by the autonomous driving control unit 100, the braking control unit 234, and the twin-clutch control unit 244 on the system.

In the first to third modes, the autonomous driving control unit 100 produces a target trajectory which is a movement trajectory from a current position to the safe zone (S510, S520, and S530). In this case, the safe zone means an area, such as a shoulder of a road, where there is no risk of secondary accident of the vehicle. The target trajectory includes a movement section and a stop section in which the safe zone is positioned. In this case, the movement section includes a turning section and/or a straight section in accordance with a shape of the target trajectory.

In the first mode, the autonomous driving control unit 100 transmits a control signal to the braking control unit 234 so that the braking torque is generated on the left and right wheels by the hydraulic braking, and the autonomous driving control unit 100 transmits a control signal to the twin-clutch control unit 244 so that the driving torque generated by the engine is distributed to the left and right wheels (S512). In this case, a distribution ratio of the driving torque to be distributed to the left wheel and a distribution ratio of the driving torque to be distributed to the right wheel may be equal to or different from each other, and the braking torque generated on the left wheel and the braking torque generated on the right wheel may be equal to or different from each other. In the turning section, the distribution ratio of the driving torque to be distributed to the left wheel and the distribution ratio of the driving torque to be distributed to the right wheel may be controlled to be different from each other, and the braking torque generated on the left wheel and the braking torque generated on the right wheel may be controlled to be different from each other. For example, in the case of the turning section in which the vehicle turns to the right, the autonomous driving control unit 100 performs control such that higher driving torque is distributed to the left wheel more than to the right wheel, and higher braking torque is generated on the right wheel more than on the left wheel. In the straight section, the distribution ratio of the driving torque to be distributed to the left wheel and the distribution ratio of the driving torque to be distributed to the right wheel may be controlled to be equal to each other, and the braking torque generated on the left wheel and the braking torque generated on the right wheel may be controlled to be equal to each other. The autonomous driving control unit 100 controls the vehicle so that the vehicle travels at the avoidance speed along the target trajectory based on the control method in the first mode. When the vehicle reaches the stop section, the autonomous driving control unit 100 stops the vehicle by generating hydraulic braking.

In the second mode, the autonomous driving control unit 100 transmits a control signal to the braking control unit 234 so that the braking torque is generated on the left and right wheels by the EPB braking, and the autonomous driving control unit 100 transmits a control signal to the twin-clutch control unit 244 so that the driving torque generated by the engine is distributed to the left and right wheels (S522). The principle of controlling the left and right wheels is identical to the principle in the first mode. However, as described above, since the EPB braking operates at a lower reaction speed than the hydraulic braking, the Pre-EPB is performed in the second mode. Therefore, in the second mode, because a slight amount of braking force is generated, a traveling speed of the vehicle is controlled to be lower than a traveling speed in the first mode. When the vehicle reaches the stop section, the autonomous driving control unit 100 stops the vehicle by generating EPB braking.

In the third mode, the autonomous driving control unit 100 transmits a control signal to the twin-clutch control unit 244 so that the driving torque generated by the engine is distributed to the left and right wheels (S532). In the turning or straight section, only the driving torque is distributed to the left and right wheels. Since braking is not performed in the third mode, the traveling speed of the vehicle is controlled to be lower than the traveling speed in the first and second modes. The autonomous driving control unit 100 decreases the speed of the vehicle by lowering in advance the driving torque from the engine before the vehicle reaches the stop section in order to stop the vehicle. The autonomous driving control unit 100 performs control so that the distribution ratio of the driving torque applied to the left and right wheels becomes 0:0, such that the vehicle only coasts.

As described above, since the hydraulic braking is performed at a higher reaction speed and with higher braking force than the EPB braking, the vehicle may perform the avoidance driving at a higher speed in the first mode than in the second mode. That is, the degree of freedom of vehicle movement control is largest in the first mode. In contrast, since braking is not performed in the third mode, it is difficult for the vehicle to perform the avoidance driving at a higher speed than in the first and second modes. Therefore, the degree of freedom of vehicle movement control is smallest in the third mode. The reason why the control mode is determined as the first mode in the situation in which all the components illustrated in FIG. 7 and described above are normally operated is that the vehicle movement control may be quickly performed in the first mode. In addition, in the second mode, because uniform braking is generated on the left and right wheels by the Pre-EPB braking, the vehicle may move more safely than in the third mode.

After controlling and moving the vehicle in each control mode, the autonomous driving control unit 100 determines whether the vehicle reaches the safe zone (S540). When the vehicle does not reach the safe zone, the autonomous driving control unit 100 continues to perform the step of determining whether the following vehicle approaches. In contrast, when the vehicle reaches the safe zone, the transmission is shifted to a P-position, thereby ending the avoidance control (S542).

Figure 10:
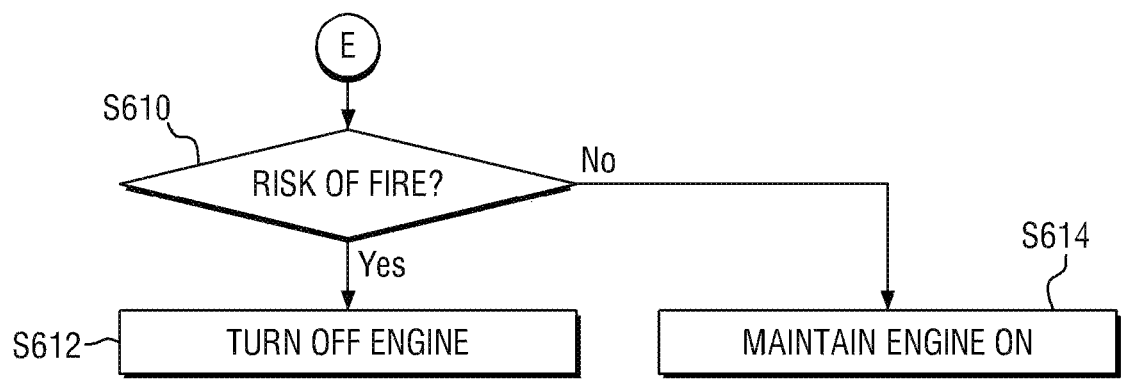
FIG. 10 is a flowchart illustrating a control method of determining whether there is a risk of fire after the vehicle is positioned in a safe zone according to the exemplary embodiment of the present disclosure.

FIG. 10 is a flowchart illustrating a control method of determining whether there is a risk of fire after the vehicle is positioned in a safe zone according to the exemplary embodiment of the present disclosure.

Referring to FIG. 10, after the vehicle reaches the safe zone, the autonomous driving control unit 100 determines whether there is a risk of fire in the vehicle (S610). Whether there is a risk of fire may be determined based on information collected by a fire detecting sensor of the information input unit 400. When there is a risk of fire, the autonomous driving control unit 100 turns off the engine (S612). When there is no risk of fire, the autonomous driving control unit 100 maintains an ON state of the engine (S614).

Figure 11:
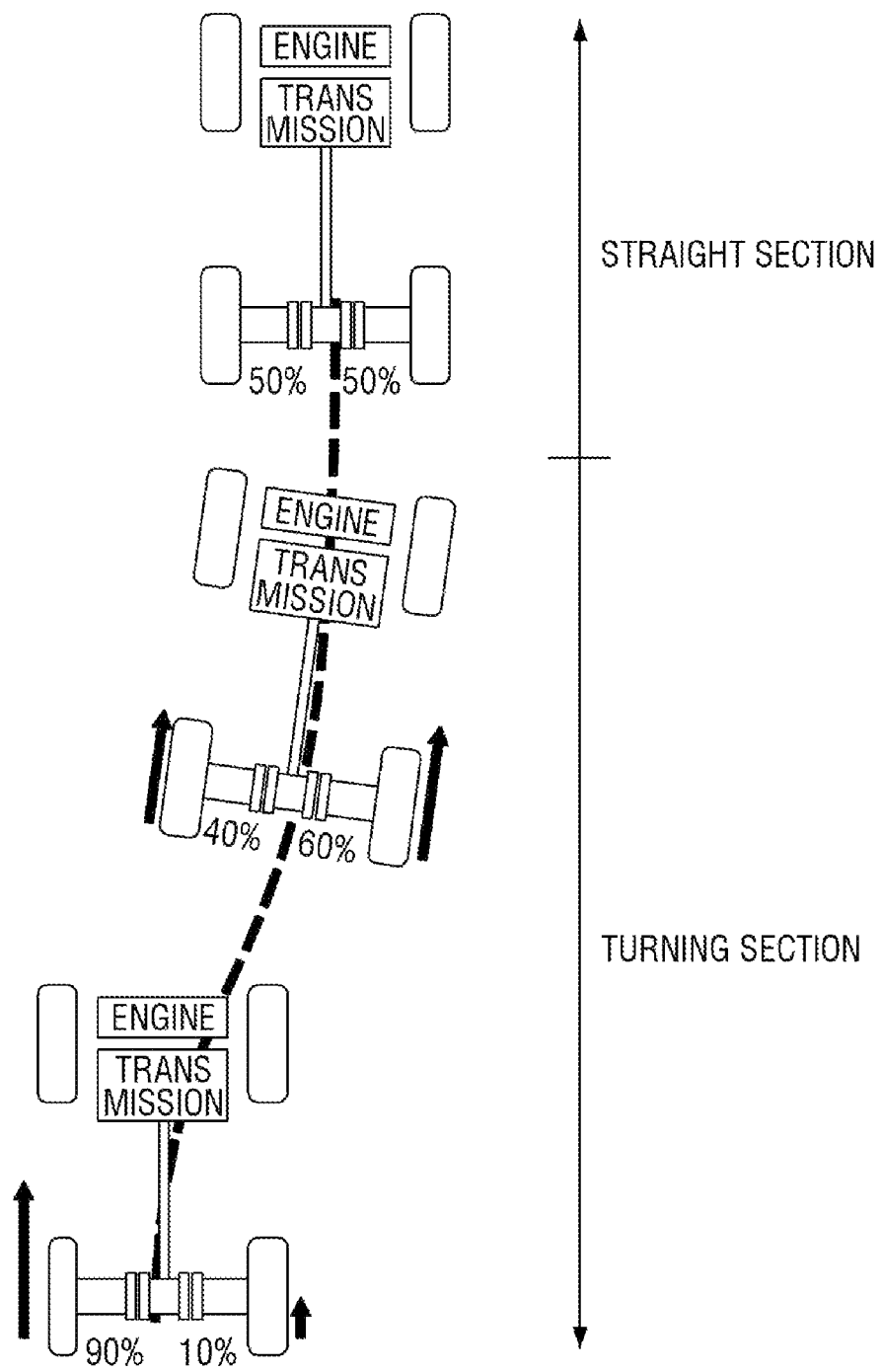
FIG. 11 is a view illustrating a state in which the vehicle moves along a target trajectory according to the exemplary embodiment of the present disclosure.

FIG. 11 is a view illustrating a state in which the vehicle moves along a target trajectory according to the exemplary embodiment of the present disclosure.

FIG. 11 illustrates a state in which the vehicle passes the turning section on the target trajectory and moves to the straight section (moves from below to above based on FIG. 11).

In the turning section in FIG. 11, the vehicle needs to turn right and then turn left. In order for the vehicle to turn right, the autonomous driving control unit 100 controls the twin clutches 242 so that higher driving torque is distributed to the left wheel (the turning outer wheel) than to the right wheel (the turning inner wheel). Thereafter, in order to turn the vehicle left, the autonomous driving control unit 100 controls the twin clutches so that higher driving torque is distributed to the right wheel (the turning outer wheel) than to the left wheel (the turning inner wheel).

In FIG. 11, a turning radius when the vehicle turns right is smaller than a turning radius when the vehicle turns left. In order to move the vehicle in a section having a small turning radius, the autonomous driving control unit 100 further increases the driving torque to be distributed to the turning outer wheel. Referring to FIG. 11, the distribution ratio of the driving torque to be applied to the left and right wheels is 9:1 when the vehicle turns right, and the distribution ratio of the driving torque to be applied to the left and right wheels is 4:6 when the vehicle turns left. If the turning radius is too small, the vehicle may not move along the turning section even though the distribution ratio of the driving torque to be applied to the turning outer wheel and the turning inner wheel is 100:0. In this case, in the first and second modes, the autonomous driving control unit 100 may reduce the turning radius by increasing the braking force of the turning inner wheel. However, because the turning radius cannot be reduced in the third mode, the driving torque needs to be reduced to move the vehicle at a low speed.

In the straight section in FIG. 11, the autonomous driving control unit 100 controls the twin clutches so that the distribution ratio of the driving torque to be applied to the left and right wheels is 5:5. The same applies to the first to third modes. However, it is possible to control and accelerate the vehicle in the first and second modes because the braking is possible, but there is a limitation in accelerating the vehicle in the third mode in order to stop the vehicle.

Figure 12:
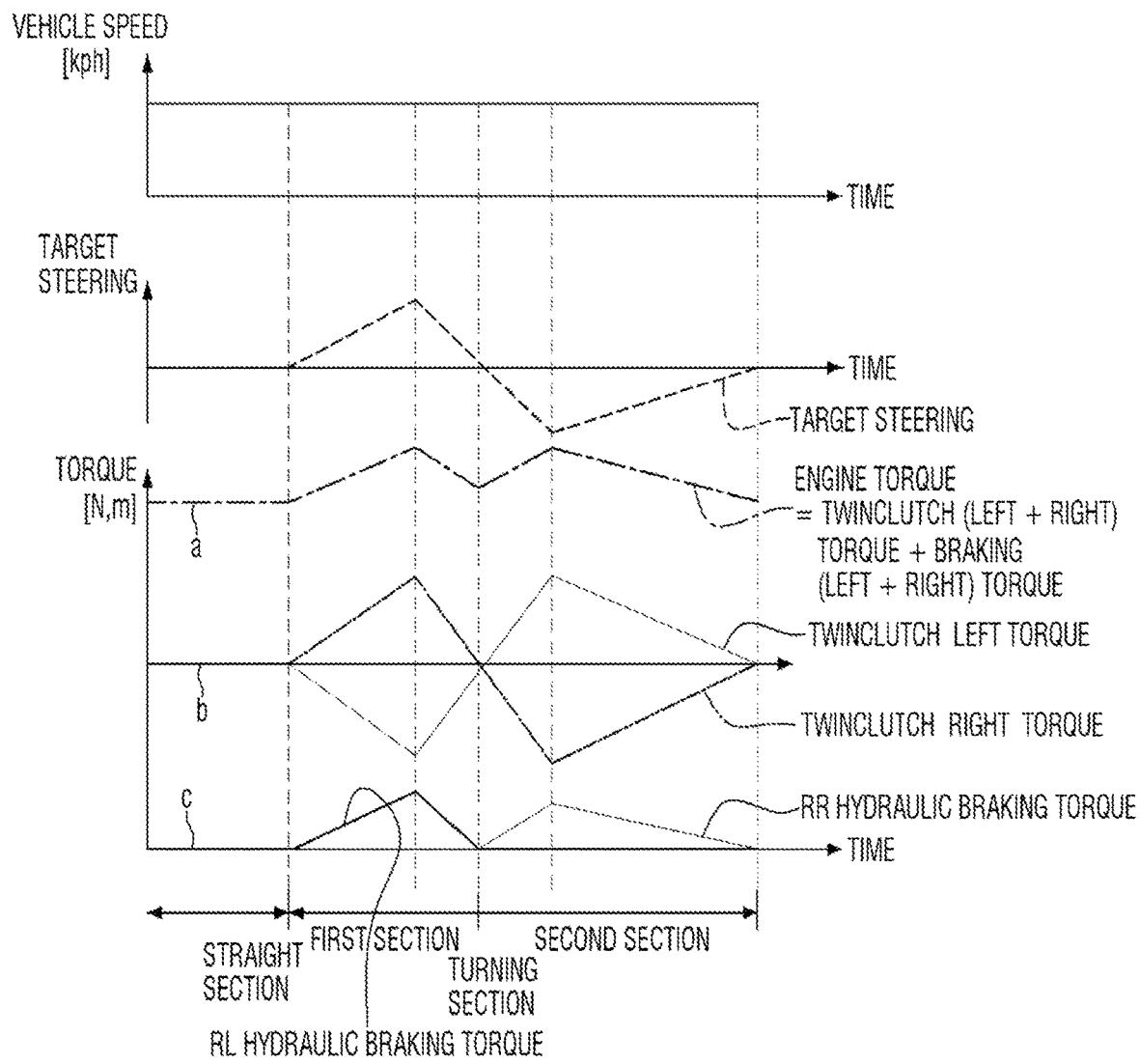
FIG. 12 is a torque graph of vehicle movement control in a first mode.
Figure 13:
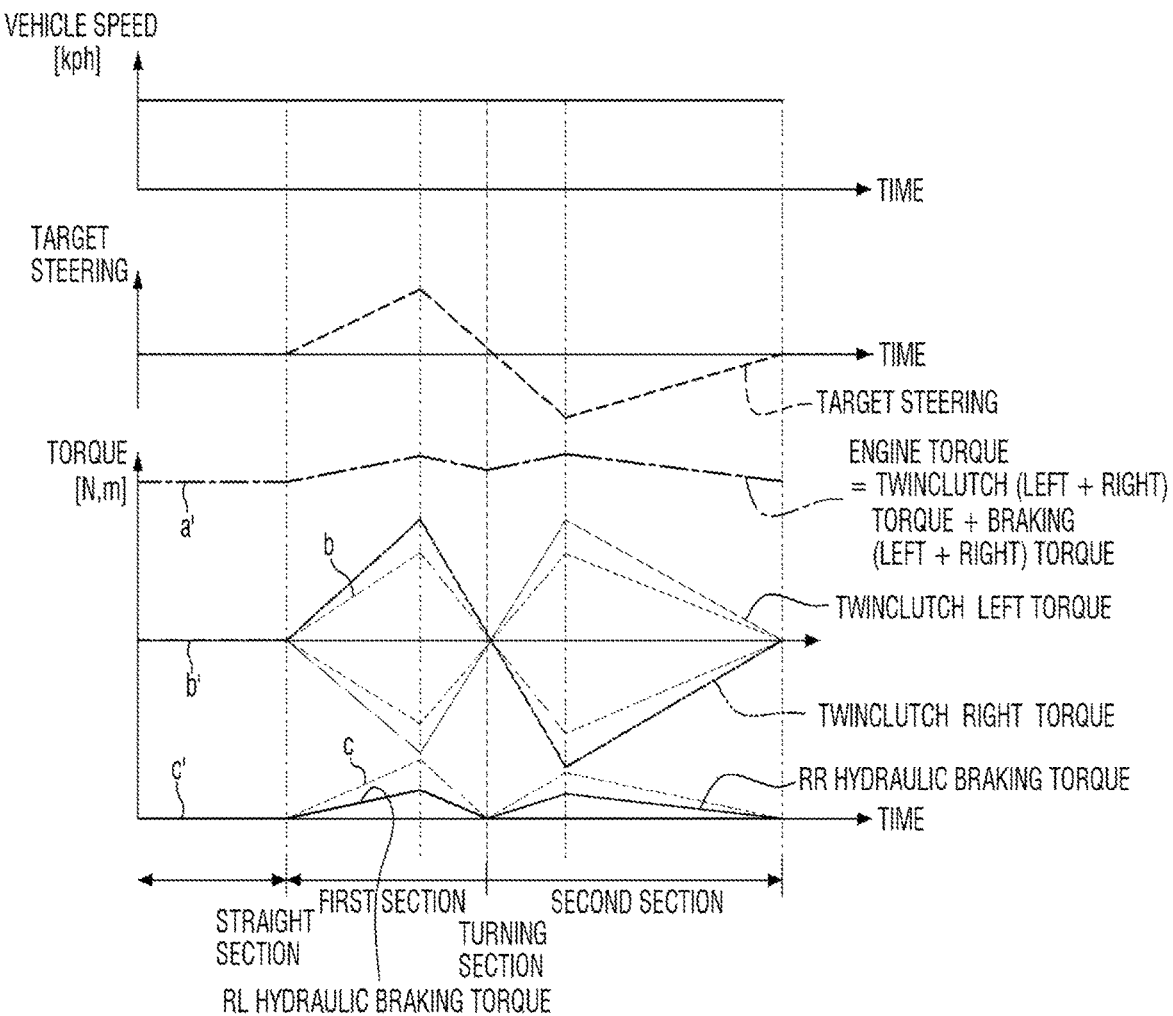
FIG. 13 is a torque graph of vehicle movement control in a second mode.
Figure 14:
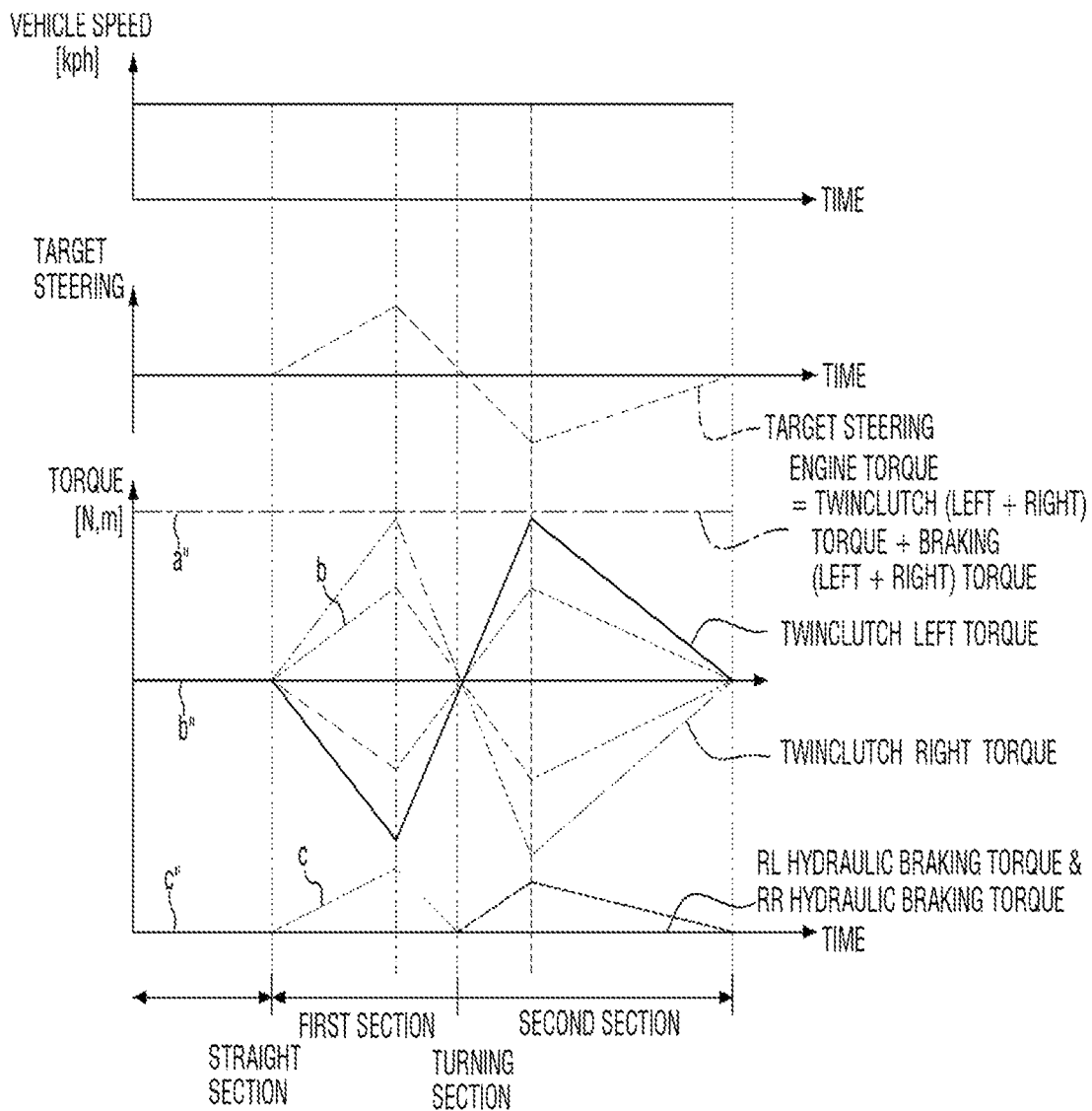
FIG. 14 is a torque graph of vehicle movement control in a third mode.

FIG. 12 is a torque graph of vehicle movement control in a first mode, FIG. 13 is a torque graph of vehicle movement control in a second mode, and FIG. 14 is a torque graph of vehicle movement control in a third mode.

FIGS. 12 to 14 illustrate a situation in which the vehicle passes the straight section and enters the turning section in the state in which a constant vehicle speed is maintained. The situations illustrated in the respective drawings have the same scenario and are controlled for each of the first to third modes, and as a result, the graphs illustrated in the respective drawings may be described by being compared to one another.

FIGS. 12 to 14 illustrate target steering graphs and torque graphs. Each of the drawings illustrates the situation in which the vehicle passes the straight section and enters the turning section when the vehicle speed is constant. The torque graph is shown as engine torque graphs (a, a', and a"), driving torque distribution graphs (b, b', and b") of the left and right wheels, and braking torque graphs (c, c', and c") of the left and right wheels. In this case, the engine torque is a sum of the driving torque and the braking torque. In the target steering graph, the upper part of the time axis means a left turn, and the lower part of the time axis means a right turn. In the torque graph, the upper part of the time axis means an increase in torque, and the lower part of the time axis means a decrease in torque.

Referring to the straight section illustrated in FIGS. 12 to 14, a target steering angle of the vehicle is 0°, the target steering graph is constantly maintained, the driving torque is equally distributed to the left and right wheels, there is no variation in driving torque, and no braking torque is generated.

In the turning section illustrated in FIGS. 12 to 14, the target steering angle is changed because the vehicle needs to turn left or right. In the first section among the turning sections illustrated in FIGS. 12 to 14, the target steering graph is disposed above the time axis, such that there occurs the situation in which the vehicle turns left. In the second section, the target steering graph is disposed below the time axis, such that there occurs the situation in which the vehicle turns right. In this case, the vehicle movement control of the autonomous driving control unit 100 is performed. The control illustrated in FIGS. 12 and 13 is simultaneously performed by the braking control and the twin clutches.

Referring to the first section illustrated in FIG. 12, the autonomous driving control unit 100 controls the twin clutches 242 to distribute high driving torque to the right wheel and distribute low driving torque to the left wheel. Referring to the driving torque distribution graph b in FIG. 12, it can be seen that in the first section, high driving torque is distributed to the right wheel, and low driving torque is distributed to the left wheel. Referring to the braking torque graph c in FIG. 12, it can be seen that in the first section, the braking torque control is simultaneously performed by the hydraulic braking, and the braking torque of the left wheel is increased when the vehicle turns left. Referring to the engine torque graph illustrated in FIG. 12, it can be seen that in the first section, the engine torque is also increased as the braking torque is increased.

Referring to the second section illustrated in FIG. 12, the autonomous driving control unit 100 performs the control in a reverse manner to the control performed in the first section. Therefore, in the first and second sections, the engine torque graphs a, the driving torque distribution graphs b, and the braking torque graphs c are disposed in the opposite directions.

Referring to the first and second sections illustrated in FIG. 13, the principle of the autonomous driving control unit 100 and the twin clutches 242 performing the braking control is identical to the control principle in the first and second sections illustrated in FIG. 12. However, since the EPB braking operates at a lower reaction speed and with smaller braking force than the hydraulic braking, it is impossible to increase the EPB braking to a magnitude of the braking torque for the hydraulic braking. The braking torque graph c' illustrated in FIG. 13 is compared with the braking torque graph c indicated by the dotted line and illustrated in FIG. 12. In this case, there is a difference in braking torque between the hydraulic braking and the EPB braking, and the difference is referred to as a first insufficient braking torque. In order to turn the vehicle along the turning section, the autonomous driving control unit 100 distributes the driving torque to the left and right wheels by a magnitude of the first insufficient braking torque. The driving torque distribution graph b' illustrated in FIG. 13 is compared with the driving torque distribution graph b indicated by the dotted line and illustrated in FIG. 12. That is, a magnitude of the driving torque to be distributed to the left and right wheels is increased by a magnitude of the first insufficient braking torque.

Referring to the first and second sections illustrated in FIG. 14, the principle of the autonomous driving control unit 100 and the twin clutches 242 performing the braking control is identical to the control principle in the first and second sections illustrated in FIG. 12. However, in the third mode, the control cannot be performed to generate the braking torque. Therefore, the braking torque graph illustrated in FIG. 14 is constantly maintained. The braking torque graph c" illustrated in FIG. 14 is compared with the braking torque graph c indicated by the dotted line and illustrated in FIG. 12. There is a difference in magnitude of braking torque between the braking torque graph c" in FIG. 14 and the braking torque graph c in FIG. 12, and the difference is referred to as a second insufficient braking torque. The second insufficient braking torque is higher than the first insufficient braking torque. Meanwhile, the autonomous driving control unit 100 distributes the driving torque to the left and right wheels by a magnitude of the second insufficient braking torque. The driving torque distribution graph b" illustrated in FIG. 14 is compared with the driving torque distribution graph b indicated by the dotted line and illustrated in FIG. 12. That is, a degree of distribution of the driving torque is increased by a magnitude of the second insufficient braking torque.

The present disclosure has been described with reference to the limited exemplary embodiments and the drawings, but the present disclosure is not limited thereto. The described exemplary embodiments may be variously changed or modified by those skilled in the art to which the present disclosure pertains within the technical spirit of the present disclosure and within the scope equivalent to the appended claims.

What is claimed is:

1. A method of moving an autonomous vehicle after an accident, the method comprising:
   setting a threshold which is a criterion for determining a failure of a chassis system, the chassis system including an engine system, a steering system, a braking system, and twin clutches;
   recognizing whether the chassis system has failed by using the threshold;
   determining whether a control mode is a first mode in which hydraulic braking and the twin clutches are cooperatively controlled, a second mode in which EPB braking and the twin clutches are cooperatively controlled, or a third mode in which only the twin clutches are controlled, based on whether the braking system has failed when the engine system and the twin clutches are normally operated;
   designating a level of an avoidance speed of a host autonomous vehicle based on whether a following vehicle approaches; and
   setting a target trajectory to a safe zone and then generating braking torque on left and right wheels or controlling distribution of driving torque through the twin clutches to move the autonomous vehicle at the avoidance speed along the target trajectory.

2. The method of claim 1, wherein setting the threshold comprises:
   setting the threshold corresponding to an error value that is a difference between a target traveling route and a current traveling route of the autonomous vehicle.

3. The method of claim 1, wherein setting the threshold comprises:
   sensing the amount of impact applied to the autonomous vehicle; and
   setting the threshold corresponding to a magnitude of the amount of impact.

4. The method of claim 1, wherein determining the control mode comprises:
   determining the control mode when the steering system is not normally operated.

5. The method of claim 1, further comprising:
   when it is determined that the control mode is the second mode, operating the EPB with a value predetermined before setting the target trajectory.

6. The method of claim 1, wherein designating the level of the avoidance speed of the host autonomous vehicle comprises:
   when communication with the following vehicle is possible, guiding, by the host autonomous vehicle, avoidance driving of the following vehicle.

7. The method of claim 1, wherein designating the level of the avoidance speed of the host autonomous vehicle comprises:
   designating the level of the avoidance speed by calculating an approaching speed and an approaching direction of the following vehicle.

8. The method of claim 1, wherein setting the target trajectory comprises:
   controlling the driving torque to distribute higher driving torque to an outer wheel instead of an inner wheel in a first turning section of the target trajectory.

9. The method of claim 8, wherein setting the target trajectory comprises:
   in the first or second mode, controlling the braking torque to distribute higher braking torque to the inner wheel instead of the outer wheel in a second turning section that has a smaller turning radius than the first turning section.

10. The method of claim 1, wherein setting the target trajectory comprises:
    controlling the driving torque to distribute the driving torque equally to the left and right wheels to accelerate the autonomous vehicle in a straight section of the target trajectory.

11. The method of claim 1, wherein setting the target trajectory comprises:
    in the first or second mode, controlling the braking torque to distribute the braking torque equally to the left and right wheels to decelerate the autonomous vehicle in a straight section of the target trajectory.

12. The method of claim 1, wherein setting the target trajectory comprises:
    controlling the autonomous vehicle to accelerate the autonomous vehicle in the first mode.

13. The method of claim 1, wherein setting the target trajectory comprises:
    controlling the autonomous vehicle to drive the autonomous vehicle at a lower speed in the third mode than in the first mode and the second mode.

14. The method of claim 1, wherein setting the target trajectory comprises:
    in the first or second mode, stopping the autonomous vehicle by distributing the braking torque to the left and right wheels in a stop section of the target trajectory.

15. The method of claim 1, wherein setting the target trajectory comprises:
in the third mode, moving the autonomous vehicle in a low-speed region in which the driving torque is lowered and stopping the autonomous vehicle in a stop section of the target trajectory.

16. The method of claim 15, wherein setting the target trajectory comprises:
in the low-speed region, controlling the autonomous vehicle to coast without distributing the driving torque to the left and right wheels.

17. The method of claim 1, wherein setting the target trajectory comprises:
determining whether there is a risk of fire after the autonomous vehicle reaches the safe zone.

* * * * *